United States Patent [19]

Matthews et al.

[11] Patent Number: 5,320,786
[45] Date of Patent: Jun. 14, 1994

[54] ZONE SINTERING OF CERAMIC FUELS

[75] Inventors: R. Bruce Matthews, Falls Church, Va.; Kenneth M. Chidester; H. Gene Moore, both of Los Alamos, N. Mex.

[73] Assignee: The United States of America as represented by the Department of Energy, Washington, D.C.

[21] Appl. No.: 798,777

[22] Filed: Nov. 27, 1991

[51] Int. Cl.$^5$ ............................................... G21G 4/00
[52] U.S. Cl. ........................................ 252/642; 264/0.5
[58] Field of Search ........................... 264/0.5; 252/642

[56] References Cited

U.S. PATENT DOCUMENTS

| | | | |
|---|---|---|---|
| 3,020,632 | 2/1962 | Krikorian et al. | 29/420 |
| 3,051,566 | 8/1962 | Schwartz | 75/213 |
| 3,063,793 | 11/1962 | Rawson | 23/14.5 |
| 3,118,764 | 1/1964 | Hammond et al. | 75/204 |
| 3,145,182 | 8/1964 | Hammond et al. | 252/301.1 |
| 3,173,753 | 3/1965 | Accary et al. | 23/14.5 |
| 3,182,102 | 5/1965 | Simnad | 264/21 |
| 3,300,284 | 1/1967 | Pilloton et al. | 23/345 |
| 3,320,034 | 5/1967 | Strausberg et al. | 23/349 |
| 3,338,988 | 8/1967 | Accary et al. | 264/0.5 |
| 3,578,610 | 5/1971 | Johnson et al. | 264/0.5 |
| 3,617,342 | 11/1971 | Shennan et al. | 117/46 |
| 3,764,550 | 10/1973 | Block et al. | 252/301.1 R |
| 3,945,629 | 3/1976 | Ragone et al. | 269/0.5 |
| 4,119,563 | 10/1978 | Kadner et al. | 252/301.1 S |
| 4,199,404 | 4/1980 | Mordarski et al. | 176/66 |
| 4,231,976 | 11/1980 | Bischoff et al. | 264/0.5 |
| 4,271,102 | 6/1981 | Hrovat et al. | 264/0.5 |
| 4,367,184 | 1/1983 | Stinton | 264/0.5 |

OTHER PUBLICATIONS

Bailar et al., "Comprehensive Inorganic Chemistry", Pergamon Press, 1973, vol. 5, pp. 357–363.
Wright, J. C., "Metallurgy in Nuclear Power Technology", Prentice-Hall Inc., 1962, pp. 1–12, 14–30.
Hampel, C. A., "Rare Metals Handbook," Reinhold Publishing Corp., 1954, pp. 542, 543.
Hausner, Henry H., "Powder Metallurgy in Nuclear Engineering," American Society of Metals, 1955, p. 197.
Finniston, H. M., "Metallurgy and Fuels", Series V, Pergamon Press, 1956, pp. 435–447.
Finniston, H. M., "Metallurgy and Fuels," Series V, vol. 2, Pergamon Press, 1959, pp. 338, 339.
Finniston, H. M., "Metallurgy and Fuels", Series V, vol. 3, Pergamon Press, 1961, pp. 89–94.
Pickles et al. in Journal of Nuclear Material 89(1980) pp. 296–315.
Chidester, LA-11954-T, Apr. 1991, Experimental Investigation of Uranium Dicarbide Densification and the Influence of Free Carbon Diffusion, is a publication of a thesis.

Primary Examiner—Daniel D. Wasil
Assistant Examiner—Daniel Jenkins
Attorney, Agent, or Firm—Bruce H. Cottrell; William A. Eklund; William R. Moser

[57] ABSTRACT

Cold pressed UC$_2$ fuel compacts are sintered at temperatures greater than about 1850° C. while in contact with a sintering facilitator material, e.g., tantalum, niobium, tungsten or a metal carbide such as uranium carbide, thereby allowing for a reduction in the overall porosity and leaving the desired product, i.e., a highly dense, large-grained uranium dicarbide. The process of using the sintering facilitator materials can be applied in the preparation of other carbide materials.

4 Claims, No Drawings

ZONE SINTERING OF CERAMIC FUELS

FIELD OF THE INVENTION

The present invention relates to the field of processing of ceramic materials, especially uranium dicarbide for nuclear reactor fuels. This invention is the result of a contract with the Department of Energy (Contract No. W-7405-ENG-36).

BACKGROUND OF THE INVENTION

Carbide fuels have been considered for advanced nuclear reactors because of properties such as high thermal conductivity, high fuel-atom metal density and high stability under most reactor conditions. For advanced reactor designs aimed at space applications, uranium monocarbide (UC), uranium dicarbide ($UC_2$), and uranium-zirconium carbide are seen as potential fuels. Considerable prior work has examined various processes for preparing UC and fabricating UC fuel pellets. For example, U.S. Pat. No. 3,578,610 to Johnson et al. describes a process for fabricating stoichiometric uranium monocarbide wherein the uranium monocarbide is placed upon tantalum carbide during sintering at temperatures from about 3500° F. and about 3800° F. However, there has been considerably less work reported on the preparation of $UC_2$ and the fabrication of $UC_2$ fuel pellets.

Most of the work on fabrication of $UC_2$ pellets by conventional techniques has generally involved the blending of high purity uranium powder and graphite and heating in an arc melter under an inert gas to form $UC_2$, followed by milling the $UC_2$, cold pressing the particles and sintering to obtain the pellets. Such a process can generally only attain densities of about 80 percent theoretical density. High density products approaching about 97 percent theoretical density have been described in Carbides in Nuclear Energy, Vol. 1, edited by Russell (1963). High density, large grained fuels are desirable for the operation of space nuclear reactors. Prior art processes have been unable to achieve high densities of greater than about 97 percent theoretical density, to achieve large grain sizes of greater than about 30 microns in diameter, or to achieve both high densities and large grain sizes.

It has been previously known to use various materials as sintering aids. For example, J. Nuclear Materials, 89, 296-315 (1980), by Pickels et al. entitled "The Sintering of Uranium Carbide and Uranium-Plutonium Carbide, and The Role of Nickel as a Sintering Additive", describes the use of nickel in a sintering process, although without the same mechanism of densification as in the present process. Further, in the Pickels et al. process, the sintering aid, i.e., the nickel additive, is essentially co-blended during the process and remains in the final composition. Thus, the sintering aids such as nickel remain in the final product as an impurity.

Accordingly, it is an object of this invention to provide a uranium dicarbide material having a high theoretical density, i.e., greater than 97 percent of theoretical density.

It is a further object of this invention to provide a uranium dicarbide material having a large crystal grain size, i.e., larger than about 30 microns.

It is a still further object of this invention to provide a uranium dicarbide material having an oxygen content of less than about 400 parts per million.

Still another object of this invention is to provide a process of preparing uranium dicarbide materials in high theoretical density, preferably with large grain sizes, such a process also suitable for the preparation of other actinide carbide reactor fuels, such as uranium monocarbide, plutonium carbide, and plutonium nitride, and preparation of difficult to fabricate structural ceramics such as silicon, niobium, tantalum, tungsten, titanium, and zirconium carbides, such a process involving sintering a precursor pellet while in contact with either a carbon accepting material or a carbon donating material depending on whether the pellet is to lose or to gain carbon respectively.

Yet another object of the invention is to provide a densification process of preparing carbide materials wherein the density is varied in a controlled manner at different regions of, e.g. a pellet.

SUMMARY OF THE INVENTION

To achieve the foregoing and other objects, and in accordance with the purposes of the present invention, as embodied and broadly described herein, the present invention provides a process of preparing uranium dicarbide compositions of the formula $UC_x$ where x is from about 1.85 to about 1.90 including placing a cold pressed uranium dicarbide compact of the formula $UC_y$ where y is from about 1.90 to about 2.4 in contact with a material capable of accepting carbon from the cold pressed $UC_2$ fuel compact and sintering said compact at temperatures and for time sufficient to form the uranium dicarbide composition of the formula $UC_x$. Preferably, the sintering is conducted at temperatures of from about 1850° C. to about 2100° C. Preferably, the material used in the sintering is selected from among the metals tantalum, niobium, or tungsten, or from the metal carbides such as uranium carbide. Such a uranium carbide should have a lower carbon content than the cold pressed uranium dicarbide compact.

The present process involving the use of a carbon accepting material during sintering may be similarly applied to the preparation of carbide compositions of the general formula $MC_x$ where M is an element selected from the group consisting of uranium, plutonium, silicon, niobium, titanium, tantalum, tungsten and zirconium and x is an number from about 1 to 2 by placing a cold pressed carbide compact of the formula $MC_y$ where y is a number from about 1.1 to about 2.4 in contact with a material capable of accepting carbon from the cold pressed carbide compact and sintering the compact for time and at temperatures sufficient to form the carbide of the formula $MC_x$.

In an analogous process, the present process may be varied during the preparation of carbide compositions of the general formula $MC_x$ where M is an element selected from the group consisting of uranium, plutonium, silicon, niobium, titanium, tantalum, tungsten and zirconium and x is an number from about 0.5 to 2 to involve the use of a carbon donating material during sintering whereby the sintered precursor will gain carbon from the carbon donating materials during sintering. In such a process a cold pressed precursor compact of the formula $MC_y$ where y is a number from about 0 to about 1.9 is placed in contact with a material capable of donating carbon to the cold pressed precursor compact and sintering the compact at temperatures and for time sufficient to form the carbide of the formula $MC_x$.

The present invention further provides a composition of matter comprising uranium dicarbide characterized as having a density of greater than 97 percent of theoretical density. The composition of matter can be further characterized as having grain sizes of greater than about 30 microns in diameter. Finally, the composition of matter can be further characterized as having an oxygen content of less than about 400 parts per million.

DETAILED DESCRIPTION

The present invention concerns a process for the preparation of uranium dicarbide and the composition of matter resulting from the process. Also, the process may be applied to the preparation of carbides of the general formula $MC_x$ where M is an element selected from the group consisting of uranium, plutonium, silicon, niobium, titanium, tantalum, tungsten and zirconium and x is an number from about 1 to 2.

In the preparation of uranium dicarbide, cold pressed $UC_2$ fuel compacts are sintered at temperatures greater than about 1850° C., preferably from about 1850° C. to about 2400° C., while in contact with a sintering facilitator material capable of accepting carbon from the cold pressed $UC_2$ fuel compacts. The term "cold pressed" is used to refer to an unsintered, low density compact of uranium and carbon, such a compact generally having a density of about 50 percent to about 60 percent of the potential theoretical density. Generally, any material with a lower carbon activity than the cold pressed uranium dicarbide, e.g., metals such as tantalum, niobium, or tungsten, or metal carbides such as uranium carbide, may be useful as the sintering facilitator. By "lower carbon activity" it is meant that the material will accept carbon from the cold pressed compact during sintering. In the present process the material used as a sintering facilitator diffuses in minor amounts into the compact, although the material is not present in the final product in any significant amount, generally less than about 50 parts per million.

By the term "compact" is meant that the particular material has originally undergone compression or pressing. The cold pressed compacts can be of any suitable shape, e.g., discs, spheres, pellets or the like up to an inch in diameter.

While not wishing to be bound by the present explanation, it is believed that the sintering facilitator materials, e.g., tantalum, serve as a sink for excess carbon thereby allowing for a reduction in the overall porosity and leaving the desired product, i.e., highly dense, large-grained compositions, e.g., uranium dicarbide compositions. Use of such sintering facilitator materials may also be applied in the sintering of other actinide carbide reactor fuels, such as uranium monocarbide, plutonium carbide, and difficult to fabricate structural ceramics such as silicon, niobium, titanium, tantalum, tungsten and zirconium carbides and provide a method to control grain size, composition, and density distribution in nuclear fuels to enhance irradiation performance. The present process may also enable the fabrication of hollow uranium dicarbide spheres for fission gas retention in high burnup propulsion reactor particle fuels.

In the process of the present invention, carbon diffusion between materials results in a densification initially occurring at the interface between materials. The densification thereafter progresses in a direction perpendicular to that interface and the densification can be terminated at anytime, e.g., prior to densification of the entire material. In this manner, the density can be varied at various regions of the material resulting in a dual density type system. Such a densification process can be termed a "directional zone sintering" wherein the sintering and densification procede in a controlled direction through the cold pressed compact.

The composition of the cold pressed uranium carbide pellet is generally from about $UC_{1.90-2.4}$, preferably from about $UC_{1.90-2.1}$. Compositions with less than about 1.90 ratio of carbon/uranium will not yield a final phase including $UC_2$. Compositions with greater than about a 2.4 ratio of carbon/uranium generally contain such an excess of carbon that insufficient carbon is lost during the sintering stage to yield the desired final phase including $UC_2$.

The sintering can generally conducted under an inert atmosphere, e.g., argon, under a reducing atmosphere, e.g., hydrogen or an argon/hydrogen blend, or under vacuum. An inert atmosphere such as argon is preferred.

The temperature during sintering of the cold pressed uranium dicarbide can generally be from about 1800° C. to about 2400° C., preferably from about 1850° C. to about 2100° C., and more preferably from about 1850° C. to about 1950° C.

Sintering at the particular selected temperature is generally conducted for periods of time from about 10 minutes to about 48 hours, more preferably from about 6 hours to about 12 hours.

Additional additives such as binders and lubricating aids may be added to the uranium dicarbide during the processing. For example, minor amounts, i.e., from about 0.1 to about 0.5 percent by weight based on total weight of composition, of a binder such as polyethylene glycol may be added to help in holding the particles together after pressing. Also, minor amounts, i.e., from about 0.1 to about 0.5 percent by weight based on total weight of composition, of stearic acid may be added as a lubricant to reduce the scoring of the pressing apparatus from the highly abrasive $UC_2$ particles. Such additives are eliminated from the uranium carbide composition either prior to or during the sintering stage by heating at temperatures at which these organic materials are vaporized.

Sintering aids may be added to the uranium carbide precursor mixture to help in obtaining densification during the present sintering process. Such sintering aids may be added to the precursor mixture in amounts sufficient to aid densification although such an addition is generally not preferred. Among the potential sintering aids are nickel.

One feature of the present process is that the composition of the final uranium dicarbide composition produced by this process generally contains less oxygen as an impurity than compositions prepared by earlier processes. The product of the present process can be characterized as containing less than about 400 parts per million of oxygen, preferably less than about 200 parts per million oxygen.

Uranium dicarbide compositions from the present process have also been characterized as large grained uranium dicarbides, i.e., having grain sizes of greater than about 30 microns in diameter. This resultant product is considered to be a novel material versus previous uranium dicarbide materials in that such a high density, large grained material has not previously been attainable. Still further, uranium dicarbide compositions from the present process can be prepared as large monolithic shapes with dimensions up to at least about one inch in diameter.

In the preparation of carbides other than uranium dicarbide such as actinide carbide reactor fuels, such as uranium monocarbide, and plutonium carbide, or difficult to fabricate structural ceramics such as silicon carbides, niobium carbides, titanium carbides, tantalum carbides, tungsten carbides and zirconium carbides, the sintering time and temperature during sintering may be varied as is appropriate to the particular material.

The present invention is more particularly described in the following examples which are intended as illustrative only, since numerous modifications and variations will be apparent to those skilled in the art.

EXAMPLE A

A cold pressed uranium dicarbide pellet was prepared as follows. Uranium dioxide was converted to uranium dicarbide as the initial material by reaction of uranium dioxide with graphite at temperatures above about 1800° C. in accordance with the chemical equation:

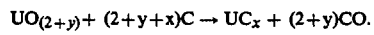

$$UO_{(2+y)} + (2+y+x)C \rightarrow UC_x + (2+y)CO.$$

$UO_2$ powder and graphite powder were hand blended and then placed into a ball mill for about 16 hours. The mixture was then sieved through a fine 250 mesh. The mixture of fine particles was then pressed into 1.91 centimeter (cm) diameter briquettes. The briquettes were placed onto graphite trays and entered into a high temperature oven for reaction by carbothermic reduction. The reduction process included drawing a vacuum of $5 \times 10^{-5}$ Torr in the furnace and heating at temperatures between 1875° C. and 2150° C. for about 4 hours. The furnace was held at the elevated temperature for at least four hours to allow sufficient time for carbon to remove the oxygen as CO and form the particular carbide depending upon the amount of carbon added. The furnace was then rapidly cooled to room temperature.

The resultant $UC_x$ briquettes were crushed and then passed through a 16-mesh screen. A binder (0.3 percent by weight polyethylene glycol) and a lubricant (0.3 percent by weight stearic acid) were added in powder form to the crushed material to hold the particles together after subsequent pressing and to protect the die press from the abrasive uranium dicarbide particles. About 2.0 grams (g) of the $UC_x$ powder, including the binder and lubricant additives, was placed into a die cavity and about 110 MPa pressure was applied to form the initial cold pressed uranium dicarbide pellet.

EXAMPLE 1

Pellets having an initial composition of $UC_{1.95}$ were placed on tantalum, tungsten and graphite trays respectively. The pellets were then heated to 2100° C. under an argon atmosphere for 12 hours to sinter the compositions. The pellets were then analyzed to determine the density as a function of theoretical density and to determine final pellet composition. Pellets sintered upon the tantalum or tungsten trays had a density of above 97 percent theoretical density and a composition of $UC_{1.88}$. In comparison, pellets sintered upon a graphite tray had a density of about 75 percent theoretical density and a composition of $UC_{1.95}$.

The results of this example demonstrate the advantages of sintering uranium dicarbide compositions while in contact with carbon accepting materials such as tantalum and tungsten whereby high theoretical densities are obtained.

Although, the present invention has been described with reference to specific details, it is not intended that such details should be regarded as limitations upon the scope of the invention, except as and to the extent that they are included in the accompanying claims.

EXAMPLE 2

Discs having an initial diameter of 1.0 inch, a thickness of 0.150 inches, and a composition of $UC_{1.95}$ were placed between two tungsten plates. The discs were then heated to 2100° C. under an argon atmosphere for 12 hours to sinter to high density. The discs were then analyzed to determine the density as a function of theoretical density and to determine final disc composition. The discs sintered without cracking to a density above 97 percent theoretical density and a composition near $UC_{1.88}$.

The results of this example demonstrate the flexibility of this technique to fabricate high density large diameter discs.

What is claimed is:

1. A composition of matter comprising uranium dicarbide characterized as having a density of greater than 97 percent of theoretical density.
2. The composition of claim 1 wherein the uranium dicarbide is further characterized as having grain sizes of greater than about 30 microns in diameter.
3. The composition of claim 1 wherein the uranium dicarbide is further characterized as having an oxygen content of less than about 400 parts per million.
4. The composition of claim 2 wherein the uranium dicarbide is further characterized as having an oxygen content of less than about 400 parts per million.

* * * * *